(12) United States Patent
Feuerstack et al.

(10) Patent No.: US 9,035,578 B2
(45) Date of Patent: May 19, 2015

(54) SYSTEM FOR COUPLING AT LEAST ONE DC SOURCE TO A CONTROLLABLE ENERGY STORE AND ASSOCIATED OPERATING METHOD

(75) Inventors: Peter Feuerstack, Ludwigsburg (DE); Erik Weissenborn, Stuttgart (DE); Martin Kessler, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 42 days.

(21) Appl. No.: 13/997,832

(22) PCT Filed: Nov. 15, 2011

(86) PCT No.: PCT/EP2011/070112
§ 371 (c)(1),
(2), (4) Date: Jun. 25, 2013

(87) PCT Pub. No.: WO2012/089398
PCT Pub. Date: Jul. 5, 2012

(65) Prior Publication Data
US 2013/0293165 A1    Nov. 7, 2013

(30) Foreign Application Priority Data
Dec. 29, 2010 (DE) .......................... 10 2010 064 317

(51) Int. Cl.
*H02P 27/06* (2006.01)
*H02J 7/00* (2006.01)
(Continued)

(52) U.S. Cl.
CPC .............. *H02P 27/06* (2013.01); *H02J 7/0024* (2013.01); *H02J 7/0055* (2013.01); *H02J 7/1423* (2013.01);
(Continued)

(58) Field of Classification Search
CPC ....................................................... H02P 27/06
USPC ............................................. 318/139, 34, 558
See application file for complete search history.

(56) References Cited

U.S. PATENT DOCUMENTS 5,710,699 A * 1/1998 King et al. .................... 363/132
6,058,032 A * 5/2000 Yamanaka et al. .............. 363/71
(Continued)

FOREIGN PATENT DOCUMENTS

CN          1689857       11/2005
DE      102010027857      10/2011
(Continued)

OTHER PUBLICATIONS

International Search Report for Application No. PCT/EP2011/070112 dated Jul. 3, 2012 (2 pages).

*Primary Examiner* — David S Luo
(74) *Attorney, Agent, or Firm* — Michael Best & Friedrich LLP

(57) ABSTRACT

The invention relates to a system for coupling at least one DC source (9) to a controllable energy store (2), which is used for controlling and supplying electrical energy to an n-phase electric machine (1), where n≥1. In this case, the controllable energy store (2) has n parallel energy supply branches (3-1, 3-2, 3-3), which are connectable firstly to a reference rail (T−) and secondly to in each case one phase (U, V, W) of the electric machine (1). An intermediate circuit (10) is connectable on the output side via a controllable coupling circuit (12) to the energy supply branches (3-1, 3-2, 3-3) of the controllable energy store (2) and on the input side to the at least one DC source (9). An associated operating method provides for a current flow from the at least one DC source (9) into the energy supply branches (3-1, 3-2, 3-3) of the controllable energy store (2) or the phases (U, V, W) of the electric machine (1) to be controlled with the aid of the controllable coupling circuit (12).

22 Claims, 3 Drawing Sheets

(51) Int. Cl.
*H02J 7/14* (2006.01)
*H02P 27/14* (2006.01)
*B60L 11/12* (2006.01)

(52) U.S. Cl.
CPC ....... *H02J 7/1492* (2013.01); *H02J 2007/0059* (2013.01); *H02J 2007/0067* (2013.01); *H02P 27/14* (2013.01); *Y02T 10/7022* (2013.01); *Y02T 10/7005* (2013.01); *Y02T 10/642* (2013.01); *Y02T 10/7055* (2013.01); *Y02E 10/766* (2013.01); *B60L 11/123* (2013.01); *Y02T 10/7077* (2013.01); *Y02T 10/92* (2013.01); *Y02T 10/6217* (2013.01)

(56) References Cited

U.S. PATENT DOCUMENTS

| | | | | |
|---|---|---|---|---|
| 6,806,671 | B2 * | 10/2004 | Kusaka et al. | 318/442 |
| 7,969,039 | B2 * | 6/2011 | Mimatsu et al. | 307/9.1 |
| 8,376,071 | B2 * | 2/2013 | Lind | 180/65.31 |

FOREIGN PATENT DOCUMENTS

| | | |
|---|---|---|
| DE | 102010027861 | 10/2011 |
| EP | 0907238 | 4/1999 |
| JP | 2009072040 | 4/2009 |

\* cited by examiner

SYSTEM FOR COUPLING AT LEAST ONE DC SOURCE TO A CONTROLLABLE ENERGY STORE AND ASSOCIATED OPERATING METHOD

BACKGROUND OF THE INVENTION

The invention relates to a system for coupling at least one DC source to a controllable energy store and to a method for operating the system according to the invention.

It is emerging that in future both stationary applications, such as wind power installations, and vehicles, such as hybrid or electric vehicles, will involve the increasing use of electronic systems that combine new energy storage technologies with electrical drive engineering. In conventional applications, an electric machine that is implemented, for instance, as a three-phase machine is operated by means of a converter in the form of an inverter. Characteristic of systems of this type is what is known as a DC intermediate circuit, via which an energy store, usually a battery, is connected to the DC side of the inverter. In order to be able to satisfy the power and energy requirements for a particular application, a plurality of battery cells are connected in series. Since the current provided by an energy store of this type must flow through all the battery cells, and since one battery cell can only conduct a limited current, additional battery cells are often connected in parallel in order to increase the maximum current.

Connecting a plurality of battery cells in series, besides creating a high total voltage, also entails the problem that the entire energy store fails if a single battery cell fails, since no battery current can then flow any longer. Such failure of the energy store can lead to failure of the entire system. In a vehicle, failure of the drive battery can result in the vehicle "breaking down". In other applications, such as the adjustment of the rotor blades in wind power installations, dangerous situations can even result from unfavorable circumstances such as heavy wind. For that reason, high reliability of the energy store is always desirable, where "reliability" refers to the capacity of a system to work perfectly for a specified time.

The earlier applications DE 10 2010 027857 and DE 10 2010 027861 describe batteries with a plurality of battery module lines that can be connected directly to an electric machine. The battery module lines in this case have a plurality of battery modules connected in series, where each battery module has at least one battery cell and an associated controllable coupling unit that makes it possible, in response to control signals, to interrupt the particular battery module line, or to bypass the at least one battery cell respectively associated with it or to connect the respective associated at least one battery cell into the particular battery module line. Through appropriate actuation of the coupling units, e.g. with the aid of pulse width modulation, it is also possible to provide suitable phase signals for controlling the electric machine, so that a separate pulsed inverter can be omitted. The pulsed inverter required to control the electric machine is thus, so to speak, integrated in the battery. For the purposes of the disclosure, the full scope of these two earlier applications is incorporated into the present application.

If batteries of this type are employed in, for instance, electric vehicles, it should be noted that battery technologies available nowadays significantly limit the range of the electric vehicles.

SUMMARY OF THE INVENTION

The present invention provides a system for coupling at least one DC source to a controllable energy store which is used to control and to supply electrical power to an n-phase electric machine, where n≥1. In this case, the controllable energy store has n parallel power supply branches, which can be connected firstly to a reference rail and secondly to in each case one phase of the electric machine. For the supply of electrical power, an intermediate circuit is provided, the output side of which can be connected via a controllable coupling circuit to the power supply branches of the controllable energy store, and the input side of which can be connected directly or indirectly to at least one DC source.

The present invention furthermore provides a method for operating a system according to the invention, where a flow of current from the at least one DC source is directed into the power supply branches of the controllable energy store or into the phases of the electric machine with the aid of the controllable coupling circuit.

The inventive coupling of an additional DC source to the controllable energy store allows additional electrical power to be made available and in this way, for example, the range of an electric vehicle to be significantly extended. The power made available can be used in this case, depending on the present operating status of the controllable energy store and of the electric machine, either to charge energy storage cells of the controllable energy source, or to support the controllable energy source in supplying power to the electric machine. The system according to the invention is particularly distinguished by an easily realizable, and therefore economical, circuit topology.

According to one embodiment of the invention, the intermediate circuit can be connected to the reference rail and the controllable coupling circuit comprises a respective current-regulated DC-DC voltage converter, in particular a buck converter, for each power supply branch. The duty ratios of the individual DC-DC voltage converters can in this case be used to feed current simultaneously, and independently of one another, into the phases of the electric machine or into the power supply branches of the controllable energy store. Both direct current and a superimposed alternating current can be implemented in this case through appropriate modulation of the duty ratio. The regulator of the controllable energy store in this case ensures the correct phase voltages at any point in time. Depending on present instantaneous values of the phase currents of the electric machine, current then flows from the DC-DC voltage converter into the electric machine to support the controllable energy store or into the controllable energy store to charge energy storage cells. The electric machine thus remains unaffected by the instantaneous level of current being supplied via the intermediate circuit.

As an alternative to configuration as a DC-DC voltage converter, the controllable coupling circuit can also comprise an n-phase inverter, wherein each inverter branch can be connected via at least one additional inductor to a respective power supply branch of the controllable energy store. This type of coupling for the DC source also permits simultaneous and mutually independent current feed into the phases of the electric machine or into the power supply branches of the controllable energy store. Space vector modulation of the inverter is performed in this case depending on the space vector modulation of the controllable energy store and on the power to be supplied from the DC source. As a result, there is no need for an electrical connection between the intermediate circuit and the reference rail in this embodiment.

If the controllable coupling circuit comprises an n-phase inverter, the inverter branches can also each be connected directly, that is to say without the interposition of an additional inductor, to a power supply branch of the controllable energy store. In this case, however, at least one additional inductor must be connected between the intermediate circuit and the at least one DC source. This inductor thus, so to speak, replaces the inductors in the connecting lines between the coupling circuit and the controllable energy store.

A particularly efficient supply of power with high availability can be achieved if the DC source comprises a range extender with a generator driven by an internal combustion engine. The generator can in this case be implemented as a DC generator or as an AC generator followed by a rectifier.

Alternatively or in addition, however, any other DC sources such as fuel cells, photovoltaic modules or wind power installations can also be employed. In principle, any desired number of DC sources of any type can be provided.

In a further embodiment of the invention, the power supply branches of the controllable energy store each have at least two energy storage modules connected in series, each of which comprises at least one electrical energy storage cell with an associated controllable coupling unit which, in response to control signals, bypasses the respective associated energy storage cells or connects the respective associated energy storage cells into the respective power supply branch. A configuration of this sort allows the dual function of the controllable energy store, that is to say control of and supply of power to the electric machine, to be implemented in a particularly simple and efficient manner.

BRIEF DESCRIPTION OF THE DRAWINGS

Further features and advantages of embodiments of the invention will emerge from the following description with reference to the attached drawings.

In the drawings.

DETAILED DESCRIPTION

Figure 1:
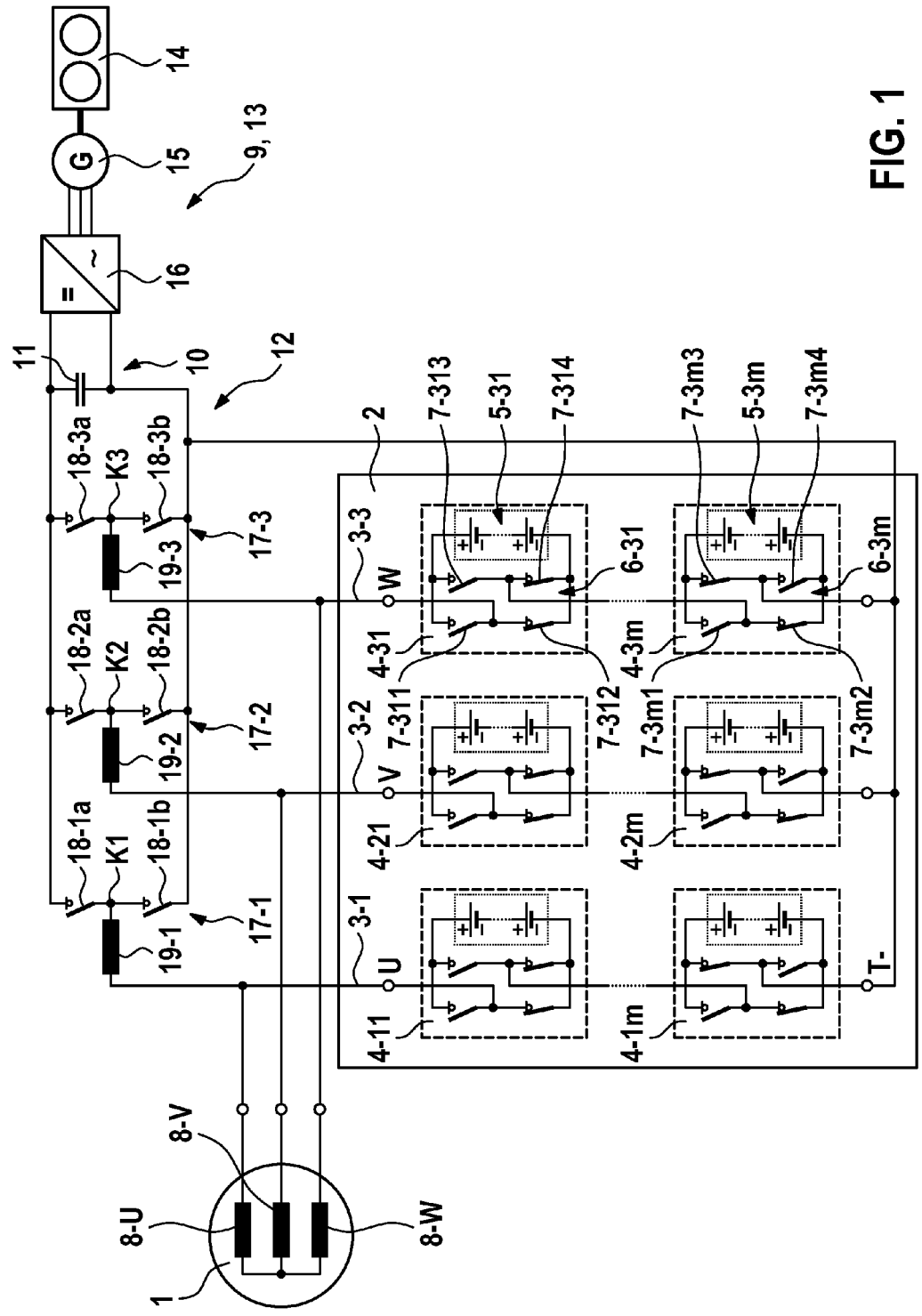
FIG. 1 shows a schematic illustration of a first embodiment of a system according to the invention for coupling at least one DC source to a controllable energy store.
Figure 2:
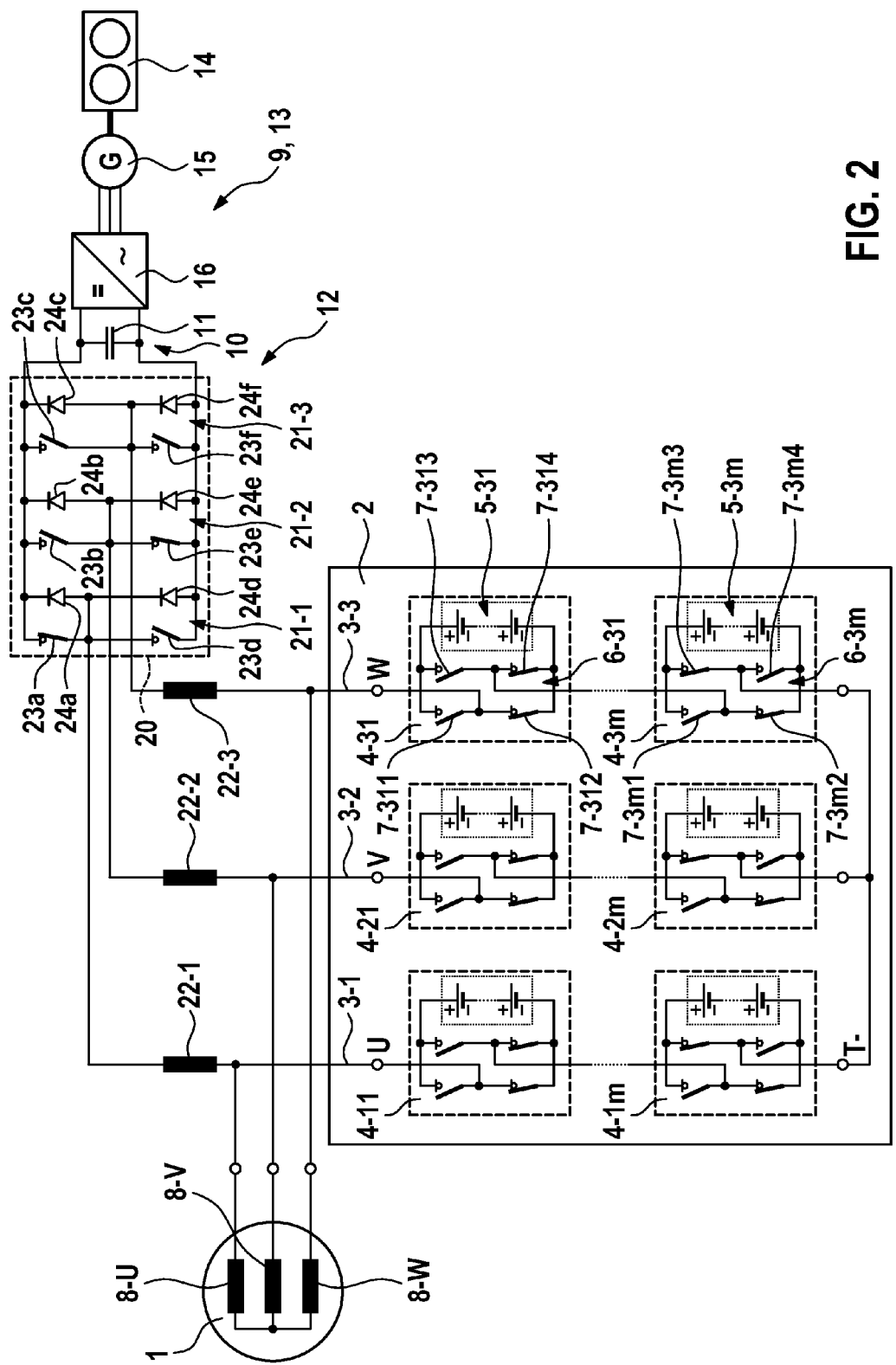
FIG. 2 shows a schematic illustration of a second embodiment of a system according to the invention for coupling at least one DC source to a controllable energy store.
Figure 3:
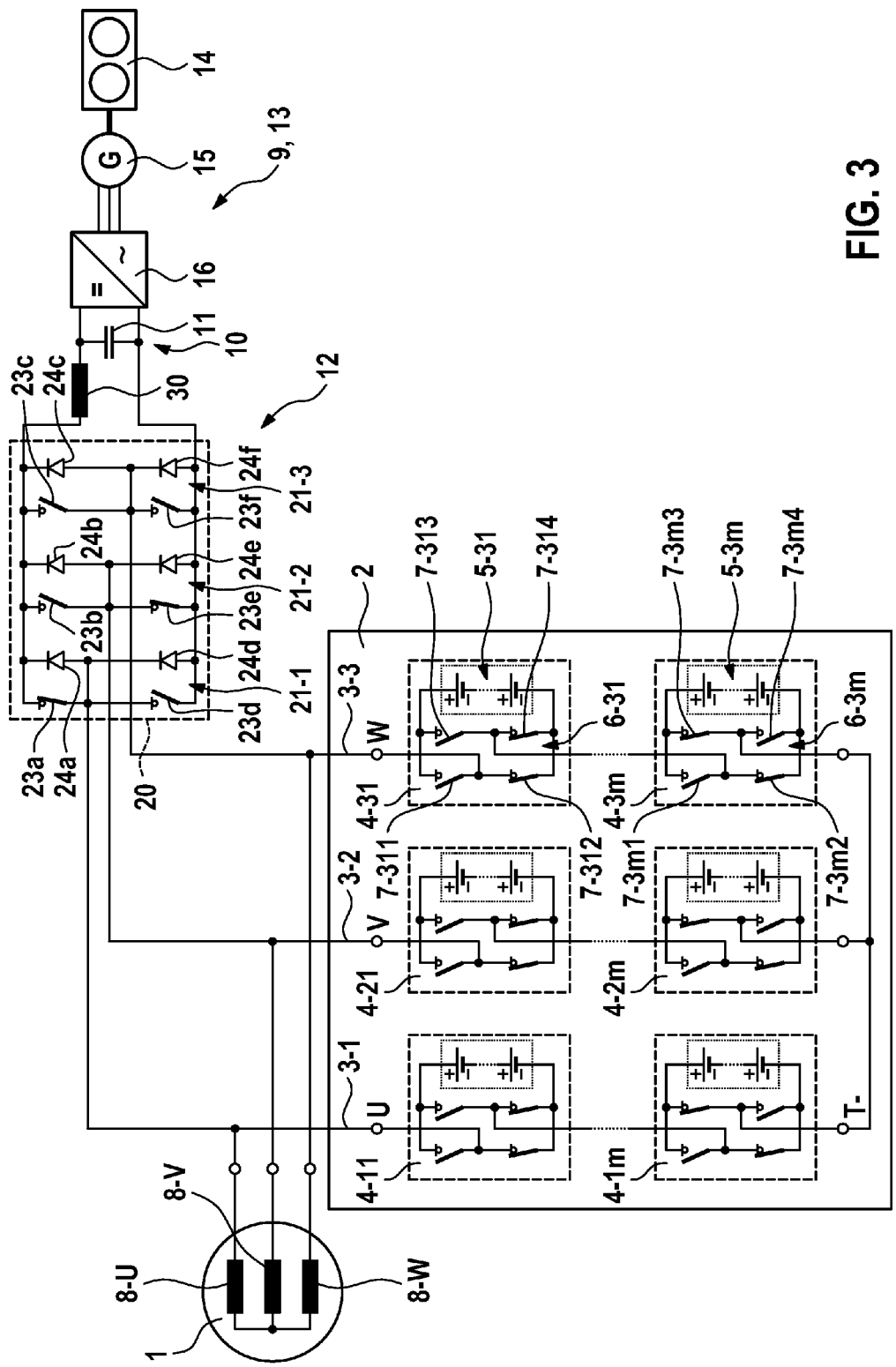
FIG. 3 shows a schematic illustration of a third embodiment of a system according to the invention for coupling at least one DC source to a controllable energy store.

FIGS. 1 to 3 show schematic illustrations of embodiments of a system according to the invention for coupling at least one DC source to a controllable energy store. A three-phase electric machine 1 is connected to a controllable energy store 2. The controllable energy store 2 comprises three power supply branches 3-1, 3-2 and 3-3, which are connected firstly to a reference potential T- (reference rail), which, in the embodiments illustrated, carries a low potential, and secondly to respective individual phases U, V, W of the electric machine 1. Each of the power supply branches 3-1, 3-2 and 3-3 comprises m energy storage modules 4-11 to 4-1$m$, 4-21 to 4-2$m$ and 4-31 to 4-3$m$ respectively connected in series, where m≥2. The energy storage modules 4 in turn each comprise a plurality of electrical energy storage cells connected in series, which for reasons of clarity are provided with reference numerals 5-31 to 5-3$m$ only in the power supply branch 3-3 that is connected to phase W of the electric machine 1. The energy storage modules 4 further each comprise a coupling unit that is associated with the energy storage cells 5 of the respective energy storage module 4. For reasons of clarity the coupling units are also provided with reference numerals 6-31 to 6-3$m$ only in the power supply branch 3-3. In the illustrated variant embodiments, the coupling units 6 are each formed by four controllable switching elements 7-311, 7-312, 7-313 and 7-314 to 7-3$m$1, 7-3$m$2, 7-3$m$3 and 7-3$m$4, which are connected up in the form of a full bridge. The switching elements can in this case be implemented as power semiconductor switches, e.g. in the form of IGBTs (insulated gate bipolar transistors) or as MOSFETs (metal oxide semiconductor field-effect transistors).

The coupling units 6 make it possible to interrupt the respective power supply branch 3 by opening all the switching elements 7 of a coupling unit 6. Alternatively, by closing two of the switching elements 7 of a coupling unit 6 in each case, the energy storage cells 5 can either be bypassed, e.g. by closing switches 7-312 and 7-314, or connected into the respective power supply branch 3, e.g. by closing switches 7-312 and 7-313.

The total output voltages of the power supply branches 3-1 to 3-3 are determined by the particular switching status of the controllable switching elements 7 of the coupling units 6 and can be adjusted in steps. The stepping depends on the voltage of the individual energy storage modules 4. If we consider the preferred embodiment in which the energy storage modules 4 are in the same form, then the maximum possible total output voltage is given by the product of the voltage of a single energy storage module 4 and the number m of energy storage modules 4 connected in series per power supply branch 3.

The coupling units 6 thus make it possible to switch the phases U, V, W of the electric machine 1 either to a high reference potential or to a low reference potential, and to that extent can also perform the function of an inverter of known type. The power and the operating mode of the electric machine 1 can in this way be controlled by appropriate actuation of the coupling units 6 by the controllable energy store 2. The controllable energy store 2 to this extent thus performs a dual function, since on the one hand it serves to supply electrical power but on the other hand also serves to control the electric machine 1.

The electric machine 1 has stator windings 8-U, 8-V and 8-W, connected together in a known star configuration.

The electric machine 1 is implemented as a three-phase machine in the exemplary embodiments illustrated, but can also have fewer or more than three phases. The number of power supply branches 3 in the controllable energy store 2 is of course also geared to the number of phases in the electric machine.

In the exemplary embodiments illustrated, each energy storage module 4 has a plurality of respective energy storage cells 5 connected in series. The energy storage modules 4 may, however, alternatively also each have only a single energy storage cell or else energy storage cells connected in parallel.

In the exemplary embodiments illustrated, the coupling units 6 are each formed by four controllable switching elements 7 in the form of a full bridge, which also affords the option of voltage reversal at the output of the energy storage module. The coupling units 6 can also, however, be implemented by a larger or smaller number of controllable switching elements, provided that the necessary functions (bypassing the power supply cells and connecting the power supply cells into the power supply branch) can be realized. In particular, the coupling units may also be in the form of half-bridges. Embodiments of this type may be found, for example, in the earlier applications DE 10 2010 027857 and DE 10 2010 027861.

A DC source 9 is coupled to the controllable energy store 2. For this purpose, an intermediate circuit (DC intermediate circuit) 10 in the form of an intermediate circuit capacitor 11 is provided, the output side of which is connected via a controllable coupling circuit 12 to the power supply branches 3 of the controllable energy store 2, and the input side of which is connected to the DC source 9. The DC source 9 in this case comprises a respective range extender 13, known per se, having an AC generator 15 driven by an internal combustion engine 14 and followed by a rectifier 16. As an alternative to an AC generator 15 followed by a rectifier 16, it is also possible to provide a DC generator. As an alternative or in addition to the range extender 13, any other DC source such as fuel cells and/or photovoltaic modules can also be connected to the intermediate circuit 10.

According to an embodiment illustrated in FIG. 1, the intermediate circuit 10 is connected to the reference rail T−, and the controllable coupling circuit 12 comprises, for each of the power supply branches 3-1, 3-2 and 3-3, a respective current-regulated DC-DC voltage converter 17-1, 17-2 and 17-3, which are implemented, in the embodiment illustrated, as buck converters. The DC-DC voltage converters 17 in this case each comprise a series circuit containing two controllable switching elements 18-1$a$ and 18-1$b$, 18-2$a$ and 18-2$b$, and 18-3$a$ and 18-3$b$ respectively. Contact points K1, K2 and K3 respectively, each of which is arranged between the two switching elements, have a respective inductor 19-1, 19-2 and 19-3 connected to them, via which the DC-DC voltage converters 17-1, 17-2 and 17-3 are connected to the power supply branches 3-1, 3-2 and 3-3 respectively of the controllable energy store, and to the phases U, V and W respectively of the electric machine 1.

The switching elements 18 of the DC-DC voltage converters 17 are controlled by a control unit, not illustrated, which preferably also controls the switching elements 7 of the coupling units 6. By means of the duty ratios of the control signals for the switching elements 18 in the individual DC-DC voltage converters 17-1, 17-2 and 17-3, current is simultaneously, and independently, fed into the phases U, V, W respectively of the electric machine 1 or into the power supply branches 3-1, 3-2 and 3-3 respectively of the controllable energy store 2. Through appropriate modulation of the duty ratios, both direct current and a superimposed alternating current can be supplied. The regulator of the controllable energy store 2 thus provides correct voltages on the phases U, V and W of the electric machine at every point in time. Depending on present instantaneous values of the phase currents of the electric machine 1, current either flows from the DC-DC voltage converter 17 into the electric machine 1 to support the controllable energy store 2 or into the controllable energy store 2 to charge energy storage cells 5. The electric machine 1 thus remains unaffected by the instantaneous level of current being supplied through the intermediate circuit 10.

According to a second embodiment of the invention, illustrated in FIG. 2, the controllable coupling circuit 12 comprises a 3-phase inverter 20, where each inverter branch 21-1, 21-2, 21-3 is connected via, in each case, at least one additional inductor 22-1, 22-2 and 22-3 respectively to one power supply branch 3-1, 3-2 or 3-2 respectively of the controllable energy store 2 and to one phase U, V or W respectively of the electric machine 1.

The inverter 20 in this case comprises controllable switching elements 23$a$-23$f$ in the form of power switches, which are connected to the individual inductors 22-1, 22-2, 22-3 and connect these either to a high voltage potential or to a low voltage potential. The switching elements 23$a$-23$f$ can, for instance, be implemented as insulated gate bipolar transistors (IGBT) or as metal oxide semiconductor field-effect transistors (MOSFET). The inverter 20 comprises moreover a plurality of freewheeling diodes 24$a$-24$f$, each of which is arranged in parallel with one of the switching elements 23$a$-23$f$.

It is also possible for coupling of the DC source in this way to supply, simultaneously and independently of one another, current to the phases U, V W of the electric machine 1 or to the power supply branches 3-1, 3-2, 3-3 of the controllable energy store 2. The switching elements 21 of the inverter 20 are in this case again controlled by a control unit, not illustrated, which preferably also controls the switching elements 7 of the coupling units 6. The control of the switching elements 21, and hence space vector modulation of the inverter 30, is then carried out depending on the space vector modulation of the controllable energy store 2 and of the electrical power to be supplied in each case from the DC source 9.

A third embodiment of the invention, illustrated in FIG. 3, differs from the second embodiment according to FIG. 2 only in that the power supply branches 3-1, 3-2 and 3-3 of the controllable energy store 2 and the phases U, V and W of the electric machine 1 are connected to the inverter branches 21-1, 21-2 and 21-3 respectively not via an inductor, but rather directly. For this purpose, an additional inductor 30 is connected between the inverter 20 and the intermediate circuit 10, and performs the function of the inductors 22 shown in FIG. 2. The fundamental principles of operation of the third embodiment do not, however, differ from those of the second embodiment.

The invention claimed is:

1. A system for coupling at least one DC source (9) to a controllable energy store (2) having
    the controllable energy store (2), which is used to control and to supply electrical power to an n-phase electric machine (1), where n≥1, wherein the controllable energy store (2) has n parallel power supply branches (3-1, 3-2, 3-3), which
        firstly are connected to a reference rail (T−) and
        secondly are connected to in each case one phase (U, V, W) of the electric machine (1), and
        thirdly each parallel power supply branch (3-1, 3-2, 3-3) has at least two energy storage modules (4) connected in series, each of which comprises at least one electrical energy storage cell (5) with an associated controllable coupling unit (6) which, in response to control signals, bypasses the respective associated energy storage cells (5), and
    an intermediate circuit (10), the output side of which is connected via a controllable coupling circuit (12) to the power supply branches (3-1, 3-2, 3-3) of the controllable energy store (2), and the input side of which is connected to the at least one DC source (9).

2. The system as claimed in claim 1, wherein the intermediate circuit (10) is connected to the reference rail (T−), and the controllable coupling circuit (12) comprises a respective current-regulated DC-DC voltage converter (17-1; 17-2; 17-3) for each power supply branch (3-1, 3-2, 3-3).

3. The system as claimed in claim 1, wherein the controllable coupling circuit (12) comprises an n-phase inverter (20), wherein each inverter branch (21-1; 21-2; 21-3) is connected via at least one additional inductor (22-1; 22-2; 22-3) to a respective power supply branch (3-1; 3-2; 3-3) of the controllable energy store (2).

4. The system as claimed in claim 1, wherein the controllable coupling circuit (12) comprises an n-phase inverter (20) and is connected via at least one additional inductor (30) to the intermediate circuit (10).

5. The system as claimed in claim 1, wherein the DC source (9) comprises a range extender (13) with a generator (15) driven by an internal combustion engine (14).

6. The system as claimed in claim 1, wherein the DC source (9) comprises at least one fuel cell.

7. A method for operating a system as claimed in claim 1, wherein a flow of current from the at least one DC source (9) is directed into the power supply branches (3-1, 3-2; 3-3) of the controllable energy store (2) with the aid of the controllable coupling circuit (12).

8. The system as claimed in claim 1, wherein the DC source (9) comprises at least one photovoltaic module.

9. The system as claimed in claim 1, wherein the DC source (9) comprises at least one fuel cell and at least one photovoltaic module.

10. The system as claimed in claim 1, wherein the power supply branches (3-1, 3-2, 3-3) of the controllable energy store (2) each have at least two energy storage modules (4) connected in series, each of which comprises at least one electrical energy storage cell (5) with an associated controllable coupling unit (6) which, in response to control signals, connects the respective associated energy storage cells (5) into the respective power supply branch (3-1, 3-2; 3-3).

11. A method for operating a system as claimed in claim 1, wherein a flow of current from the at least one DC source (9) is directed into the phases (U, V, W) of the electric machine (1) with the aid of the controllable coupling circuit (12).

12. A system for coupling at least one DC source (9) to a controllable energy store (2) having
the controllable energy store (2), which is used to control and to supply electrical power to an n-phase electric machine (1), where n≥1, wherein the controllable energy store (2) has n parallel power supply branches (3-1, 3-2, 3-3), which
firstly are connected to a reference rail (T−) and
secondly are connected to in each case one phase (U, V, W) of the electric machine (1), and
thirdly each parallel power supply branch (3-1, 3-2, 3-3) has at least two energy storage modules (4) connected in series, each of which comprises at least one electrical energy storage cell (5) with an associated controllable coupling unit (6) which, in response to control signals, connects the respective associated energy storage cells (5) into the respective power supply branch (3-1, 3-2; 3-3), and
an intermediate circuit (10), the output side of which is connected via a controllable coupling circuit (12) to the power supply branches (3-1, 3-2, 3-3) of the controllable energy store (2), and the input side of which is connected to the at least one DC source (9).

13. The system as claimed in claim 12, wherein the intermediate circuit (10) is connected to the reference rail (T−), and the controllable coupling circuit (12) comprises a respective current-regulated DC-DC voltage converter (17-1; 17-2; 17-3) for each power supply branch (3-1, 3-2, 3-3).

14. The system as claimed in claim 12, wherein the controllable coupling circuit (12) comprises an n-phase inverter (20), wherein each inverter branch (21-1; 21-2; 21-3) is connected via at least one additional inductor (22-1; 22-2; 22-3) to a respective power supply branch (3-1; 3-2; 3-3) of the controllable energy store (2).

15. The system as claimed in claim 12, wherein the controllable coupling circuit (12) comprises an n-phase inverter (20) and is connected via at least one additional inductor (30) to the intermediate circuit (10).

16. The system as claimed in claim 12, wherein the DC source (9) comprises a range extender (13) with a generator (15) driven by an internal combustion engine (14).

17. The system as claimed in claim 12, wherein the DC source (9) comprises at least one fuel cell.

18. The system as claimed in claim 12, wherein the power supply branches (3-1, 3-2, 3-3) of the controllable energy store (2) each have at least two energy storage modules (4) connected in series, each of which comprises at least one electrical energy storage cell (5) with an associated controllable coupling unit (6) which, in response to control signals, bypasses the respective associated energy storage cells (5).

19. A method for operating a system as claimed in claim 12, wherein a flow of current from the at least one DC source (9) is directed into the power supply branches (3-1, 3-2; 3-3) of the controllable energy store (2) with the aid of the controllable coupling circuit (12).

20. The system as claimed in claim 12, wherein the DC source (9) comprises at least one photovoltaic module.

21. The system as claimed in claim 12, wherein the DC source (9) comprises at least one fuel cell and at least one photovoltaic module.

22. A method for operating a system as claimed in claim 12, wherein a flow of current from the at least one DC source (9) is directed into the phases (U, V, W) of the electric machine (1) with the aid of the controllable coupling circuit (12).

* * * * *